United States Patent [19]

Luck, Jr.

[11] 4,383,168
[45] May 10, 1983

[54] AUTOMATIC FOCUSING APPARATUS

[75] Inventor: Clarence F. Luck, Jr., Waltham, Mass.

[73] Assignee: Raytheon Company, Lexington, Mass.

[21] Appl. No.: 155,862

[22] Filed: Jun. 2, 1980

[51] Int. Cl.³ .............................................. G01J 1/20
[52] U.S. Cl. .................................. 250/201; 350/6.2
[58] Field of Search ............... 353/101; 352/140; 250/201, 204, 209, 214 R; 354/25 R; 356/1, 4; 369/45; 350/6.1, 6.2, 6.3, 6.4

[56] References Cited

U.S. PATENT DOCUMENTS

| | | | |
|---|---|---|---|
| 3,418,477 | 12/1968 | Knutrud et al. | 250/201 |
| 3,932,700 | 1/1976 | Snopko | 250/201 |
| 4,074,312 | 2/1978 | Van Rosmalen | 369/45 |
| 4,146,327 | 3/1979 | Harris | 356/4 |
| 4,201,475 | 5/1980 | Bodlaj | 356/4 |

Primary Examiner—David C. Nelms
Attorney, Agent, or Firm—John T. Meaney; Joseph D. Pannone; Richard M. Sharkansky

[57] ABSTRACT

Automatic focusing apparatus comprising a beam focusing assembly disposed for directing through an axially spaced focal spot a scanning light beam having a periodic translational movement characterized by a first fundamental frequency component, a focus evaluating assembly disposed for detecting adjacent the focal spot a periodic translational movement of the focused beam characterized by a fundamental frequency component which is compared with said first fundamental frequency component to determine the relative phase relationship, and a target positioning assembly disposed for automatically positioning a selected surface of a target at the focal spot in accordance with the periodic translational movement of the focused beam and said determination of relative phase relationship.

This automatic focusing apparatus may be embodied in a laser material removal system having a laser source connected to the focus evaluating assembly for automatic activation when the selected surface of a target is positioned at the focal spot to direct a light beam of suitably high energy onto the selected surface for removing material therefrom.

18 Claims, 23 Drawing Figures

AUTOMATIC FOCUSING APPARATUS

BACKGROUND OF THE INVENTION

1. Field of the Invention

This invention relates generally to focusing apparatus and is concerned more particularly with apparatus for automatically maintaining a laser beam focused on a surface of a workpiece.

2. Discussion of the Prior Art

A relatively high energy laser beam may be employed advantageously for precision removal of material from selected areas of a workpiece. In the manufacture of semiconductor devices, for example, a high intensity laser beam may be used for trimming microcircuit resistive elements or for vaporizing conductive links deposited on a dielectric substrate to produce a microcircuit having a desired configuration. The laser beam also may be used for burning holes of accurate size in covering layers of dielectric material to expose specified areas of conductors and accomplish a desired task, such as trimming or vaporizing, for example.

Consequently, a semiconductor device may be suitably mounted on a computer controlled work table for moving along X and Y coordinates in a plane which extends transversely through the path of the laser beam. While traversing the path of the beam, selected surface areas of the device may be positioned in alignment with the laser beam for respective predetermined intervals of time sufficient for the beam to accomplish the desired task in each of the selected areas. However, it may be found that for numerous reasons, such as irregularities in the surface of the workpiece or in the movement of the table, for examples, some of the selected surface areas of the workpiece are out of focus with the laser beam. As a result, holes drilled in overlying layers of dielectric material may be oversize and extend over into undesired surface areas of the device. Also, underlying microcircuit elements may not be adequately trimmed or conductive links may not be completely vaporized to produce the circuit having the desired configuration.

Thus, material removal systems of the described type may advantageously be provided with means for automatically maintaining the laser beam in-focus on the selected surface of semiconductor device. The prior art shows a number of assemblies designed for maintaining a beam in-focus on a target surface. Some of these prior art assemblies are dependent on variations in a return angle of a beam reflected from the target surface, which may prove to be unsatisfactory when the target surface is specular. Other prior art assemblies are based on producing minute variations in the focal distance to determine resulting differences in image intensity or contrast from which is derived an error signal indicative of an out-of-focus condition. However, the resulting differences in image intensity or contrast may be partly due differences in target surface reflectivity; and the apparatus required for producing the modulations in focal distance may be quite complex.

Therefore, it is desirable to provide a focusing apparatus having automatic means which is virtually insensitive to amplitude variations caused by differences in reflectivity of the target surface or to return angle deviations of a reflected beam, and does not require minute modulations of the focal distance to determine corrective motion required for maintaining a beam in-focus on a target surface.

SUMMARY OF THE INVENTION

Accordingly, these and other disadvantages of the prior art are overcome by this invention which provides beam focusing apparatus including scanning means for determining whether a selected surface of a workpiece is positioned in the focal plane of the apparatus. The scanning means comprises a beam translating device rotatably disposed on the optical axis of the apparatus for translating a focus evaluating beam of electromagnetic radiation laterally with respect to the optical axis. The scanning means preferably includes drive means coupled to the beam translating device for oscillatingly rotating the device about an axis orthogonal to the optical axis to provide continuous monitoring of the position of the selected surface relative to the focal plane.

The apparatus also includes beam focusing means comprising one or more optical elements disposed in spaced optical alignment with the scanning means and the workpiece for focusing the translated beam to a focal spot in the focal plane of the apparatus. The workpiece is movably supported, as by a work table, for example, on the optical axis with its selected surface directed toward the beam focusing means and disposed in the path of the focus evaluating beam. As a result, the focus evaluating beam produces on the selected surface of the workpiece an image spot which may remain stationary or move translationally depending on the position of the selected surface relative to the focal plane.

The apparatus preferably includes automatic means for maintaining the selected surface of the workpiece in the focal plane of the apparatus. The automatic means may comprise means for sensing periodic translational movement of the image spot on the selected surface of the workpiece relative to the optical axis of the apparatus, means for comparing the translational movement of the image spot with the rotational movement of the beam translating device to determine the phase relationship, and means coupled to the workpiece for moving the selected surface along the optical axis in accordance with the determination.

The apparatus may be embodied in a laser material removal system having a laser source connected to the automatic means for automatically producing a material removal beam of electromagnetic radiation when the selected surface of the workpiece is positioned at the focal plane. The laser source preferably is coupled to the beam focusing means for directing the material removal beam through the beam focusing means to a selected area of the workpiece, while the focus evaluating beam is continuously monitoring focus conditions to maintain the selected surface automatically in the focal plane.

BRIEF DESCRIPTION OF THE DRAWINGS

For a better understanding of this invention, reference is made in the following detailed description to the drawings wherein.

DESCRIPTION OF THE PREFERRED EMBODIMENTS

Figure 1:
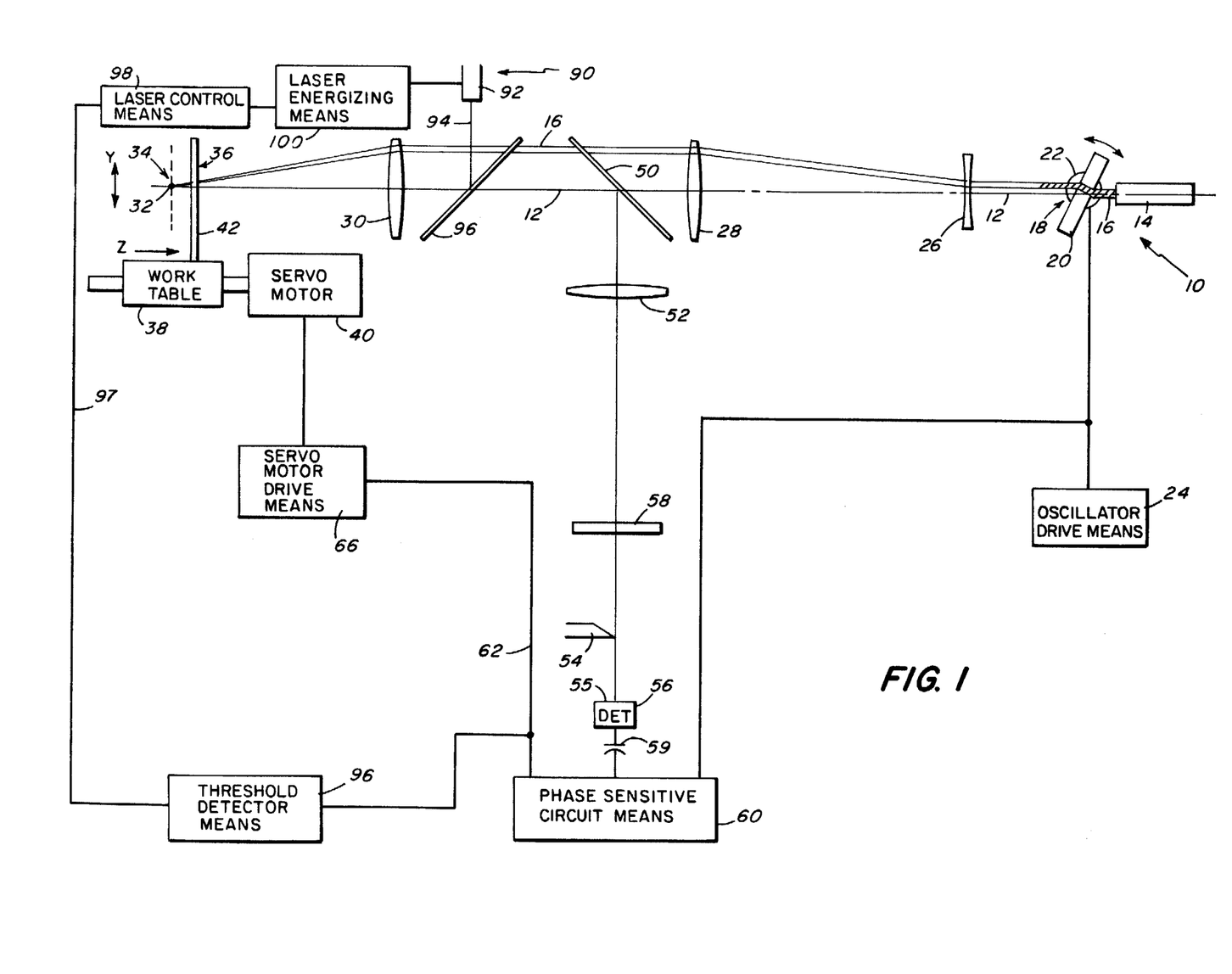
FIG. 1 is a schematic view of a beam focusing apparatus embodying the invention.

Referring to the drawings wherein like characters of reference designate like parts, there is shown in FIG. 1 a beam focusing apparatus 10 having an optical axis 12 which terminates at one end in a source 14 of electromagnetic radiation. Source 14 preferably comprises a laser of the helium-neon type which is disposed to direct along axis 12 a collimated beam 16 of coherent light energy suitable for evaluating focusing conditions. The beam 16 passes through a beam scanning means 18 including a lateral beam translating means, such as plate 20, for example, which is disposed substantially normal to optical axis 12. Plate 20 comprises a substantially flat plate of radiation transmissive material, such as glass, for example, having a predetermined index of refraction. Thus, the plate 20 has a substantially uniform thickness and a parallel pair of opposing surfaces interceptingly disposed in the path of beam 16. The plate 20 is supported for rotation about an axis substantially perpendicular to axis 12 by appropriate means, such as motor 22, for example. The motor 22 is energized by a suitable electrical drive means 24, such as a conventional oscillator, for example, for oscillatingly rotating plate 20 in a periodic symmetrical manner having a predetermined frequency component. As a result, opposing portions of plate 20 sweep back and forth over respective arcuate paths on opposing sides of optical axis 12.

Figure 2A:
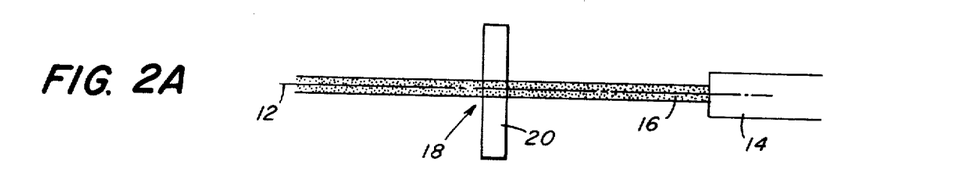
FIGS. 2A, 2B, 2C, 2D and 2E are schematic views illustrating operation of the beam scanning means shown in FIG. 1.

As shown in FIG. 2A, when plate 20 is rotated into axial alignment with the axis 12, beam 16 passes through plate 20 substantially undeflected from its path along axis 12. However, as viewed in FIG. 2B, when plate 20 is rotated an angle $\theta_1$ in the clockwise or positive direction, beam 16 is refracted within the plate and emerges travelling along a path substantially parallel with axis 12 but spaced therefrom a distance "$d_1$" in the positive Y direction with respect to axis 12. Similarly, when the plate 20 is rotated a greater angle $\theta_2$ in the clockwise or positive direction, as viewed in FIG. 2C, the beam 16 is refracted a correspondingly greater amount in plate 20 and emerges travelling along a path substantially parallel with axis 12 but spaced therefrom a proportionately greater distance "$d_2$" in the positive Y direction.

Figure 2B:
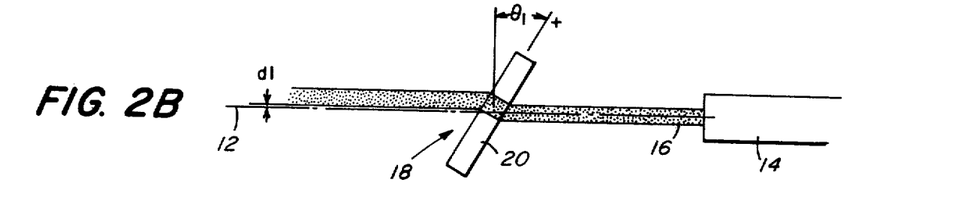
Figure 2C:
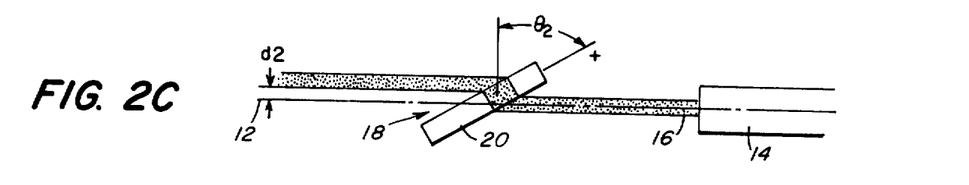
Figure 2D:
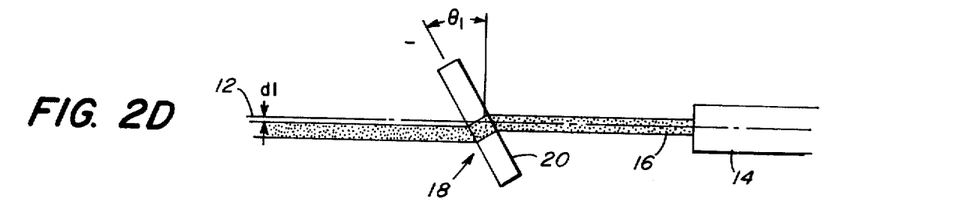
Figure 2E:
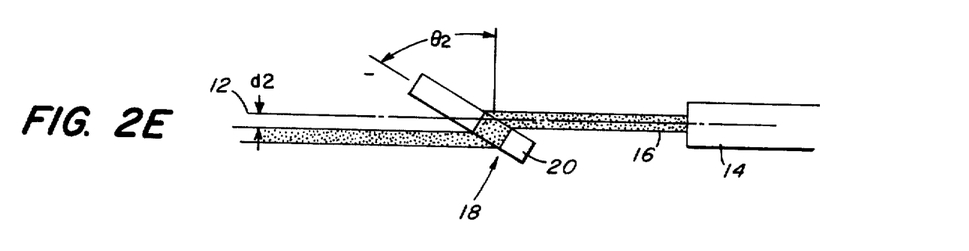

On the other hand, when the plate 20 is rotated angle $\theta_1$ in the counterclockwise or negative direction, as viewed in FIG. 2D, the beam 16 is refracted within plate 20 in the opposite angular direction as compared with the refracted beams shown in FIGS. 2B and 2C. Consequently, the beam 16 emerges from plate 20 following a path substantially parallel with axis 12 but spaced therefrom a distance "$d_1$" in the negative Y direction with respect to axis 12. Also, when the plate 20 is rotated a greater angle $\theta_2$ in the counterclockwise or negative direction, as viewed in FIG. 2E, the beam 16 is refracted a correspondingly greater amount in plate 20 to emerge following a path substantially parallel with axis 12 but spaced therefrom a proportionately greater distance "$d_2$" in the negative Y direction. Thus, the beam translating device 18, motor 22, and drive means 24 constitute a beam scanning means for directing the beam 16 along paths substantially parallel with axis 12 while causing the beam 16 to sweep periodically back and forth across the axis 12 in a simple harmonic motion having a frequency component the same as the frequency component of the oscillatingly rotating plate 20.

Referring again to FIG. 1 the scanning beam 16 passes through a double concave lens 26 which refracts the beam to follow a divergent path with respect to the axis 12. The divergent beam 16 is intercepted by a double convex lens 28 which refracts the beam to follow a substantially parallel path with axis 12, but spaced laterally therefrom a proportionately greater distance than the lateral translation imparted by plate 20. Thus, the double concave lens 26 and double convex lens 28, in combination, function as a Galilean telescope to amplify the lateral translational movement of beam 16 produced by the beam scanning means 18. This amplified translational movement of beam 16 enables the beam to pass through outer peripheral portions of an aligned objective lens 30, as well as the inner central portion thereof, during each scanning cycle. The scanning beam 16 in passing through various portions of lens 30 is refracted to emerge following respective paths which converge to cross the optical axis 12 at a common focal point 32 in a focal plane 34 of apparatus 10.

A target 36, such as a semiconductor device, for example, is supported transversely of axis 12 and adjacent focal plane 34 for axial movement by conventional means, such as a work table 38 suitably coupled to a servo motor 40, for example. The target 36 is supported on the work table 38 with a selected surface 42 of the target directed toward the objective lens 30 and interceptingly disposed in the path of the focused beam 16. Thus, the motor 40 may be operated to move the target 36 along axis 12 in the +Z or −Z directions with respect to focal spot 32 to position the selected surface 42 at the focal plane 34. Although not shown for purposes of clarity, the work table 38 also may be suitably coupled to similar conventional means for moving the target 36 reciprocally along respective X and Y axes in focal plane 34 to position a particular portion of selected surface 42 at the focal point 32 in plane 34.

Figure 3A:
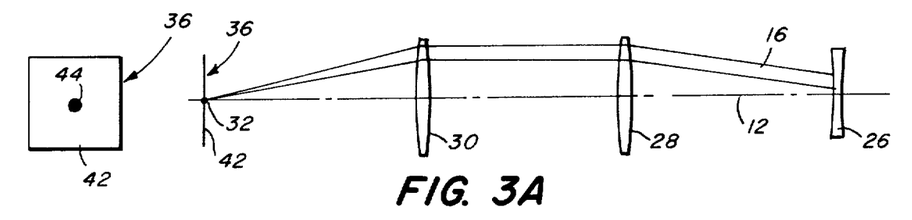
FIGS. 3a, 3b and 3c are schematic views illustrating various positions of the target surface shown in FIG. 1 relative to the focal plane of the apparatus.
Figure 3B:
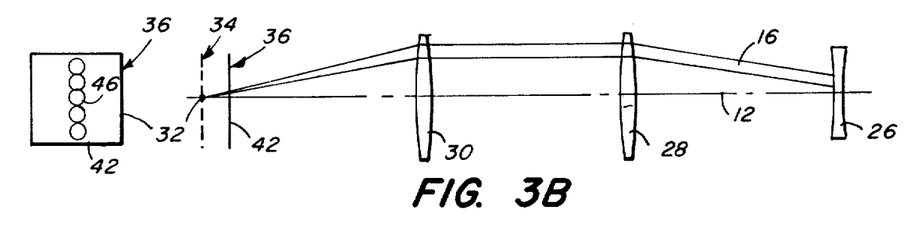

As shown in FIG. 3A, when the selected surface 42 of target 36 is positioned in the focal plane 34, a minimum size image spot 44 is produced on surface 42 and does not move translationally with the scanning movement of beam 16 caused by oscillatory rotation of plate 20. The reason for the minimum size image spot 44 remaining substantially stationary is due to the focused beam 16 following a plurality of mutually convergent paths which all intersect the axis 12 at the focal point 32 of plane 34. As shown in FIG. 3B, when the selected surface 42 of target 36 is positioned in the −Z direction with respect to focal spot 32 or between the objective lens 30 and focal plane 34, the scanning beam 16 produces on surface 42 an out-of-focus image spot, such as 46, for example, which undergoes oscillating translational movement having the same frequency component as the scanning movement of focused beam 16 and the oscillating rotational movement of plate 20. Furthermore, this oscillating translational movement of image spot 46, in this instance, is in-phase with the scanning movement of beam 16 prior to crossing axis 12 at the focal point 32. Thus, when the focused beam 16 moves in the positive Y direction, the image spot 46 also moves in the positive Y direction; and when the focused beam 16 moves in the negative Y direction, the image spot 46 also moves in the negative Y direction.

Figure 3C:
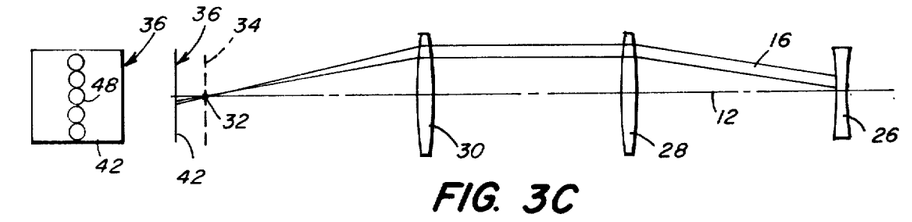

However, as shown in FIG. 3C, when the selected surface 42 is disposed an equivalent out-of-focus distance beyond the focal plane 34 or in the positive Z direction with respect to focal spot 32, the scanning beam 16 produces on surface 42 a corresponding size image spot 48 which also undergoes oscillating translational movement on surface 42 but in the opposite manner. Thus, when the focused beam 16 moves in the positive Y direction, the image spot 48 moves in the negative Y direction; and when the focused beam 16 moves in the negative Y direction, the image spot 48 moves in the positive Y direction. Consequently, in this latter instance, the translational movement of image spot 48 on surface 42 has the same frequency component but is out-of-phase with the scanning movement of beam 16 prior to crossing axis 12 at focal point 32. Accordingly, by detecting translational movement of the image spot produced on selected surface 42 by beam 16, it is possible to determine whether or not the surface 42 is in the focal plane 34. Further, by comparing the phase of rotational movement of plate 20 with the phase of resulting translational movement of the image spot produced on surface 42, it is possible to determine in which direction the target 36 should be moved to bring the surface 42 into the focal plane 34.

Referring again to FIG. 1, there may be positioned on axis 12 and in spaced relationship between the respective lenses 28 and 30, an image viewing means, such as semi-transparent mirror 50, for example. Mirror 50 is angularly disposed with respect to axis 12 for reflecting the image produced by beam 16 on selected surface 42 to an optically aligned lens 52. Lens 52 is positioned with respect to lens 30 for imaging the light from minimum size image spot 44, which is substantially stationary on surface 42, centrally on a receptor surface 55 of a radiation responsive detector 56. A knife edge 54, or any other reticle device for aiding in the detection of phase of relative movement, is interceptingly disposed in front of receptor surface 55 such that it blocks approximately one-half of the light from minimum size image spot 44 and prevents it from reaching the receptor surface 55 of detector 56. Consequently, when the remaining approximately one-half of the light from minimum size image spot 44 reaches receptor surface 55, the detector produces a corresponding electrical output signal which may be considered as the zero or null signal for positioning the selected surface 42 in focal pane 34. Preferably, a radiation bandpass filter means 58 is disposed between the lense 52 and the knife edge 54 for selectively transmitting radiation having a predetermined wavelength, such as 6328 Angstrom Units, for example, associated with beam energy emitted from the helium-neon laser source 14. The output of detector 56 is electrically connected through a blocking capacitor 59 to one input of a phase sensitive detector circuit 60 which has another input electrically connected to the oscillatory drive means 24. Circuit 60 may be provided with an output conductor, 62 which is connected to servo drive means 66 for energizing the servo motor 40 to move work table 38 and target 36 as described.

Figure 4:
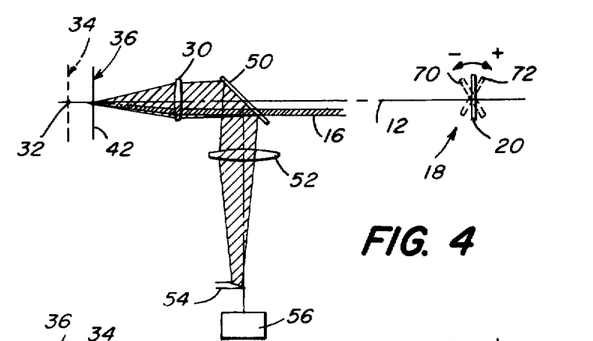
FIG. 4 is a schematic view of the image viewing means shown in FIG. 1 with the target surface in front of the focal plane.

As shown in FIG. 4, when the selected surface 42 of target 36 is located between the focal plane 34 and objective lens 30, counterclockwise or negative rotation of plate 20 to a position, such as 70, for example, causes the image spots produced on selected surface 42 to be displaced translationally in the negative direction with respect to axis 12. As a result, light from the negatively displaced image spots on surface 42 is blocked by the knife edge 54 from reaching the receptor surface 55 of detector 56. On the other hand, clockwise rotation of plate 20 to a position, such as 72, for example, causes the image spots produced on selected surface 42 to be displaced in the positive direction with respect to axis 12. Thus, only the light from the image spots displaced in the positive direction with respect to axis 12 reaches the receptor surface 55 of detector 56.

Figure 6A:
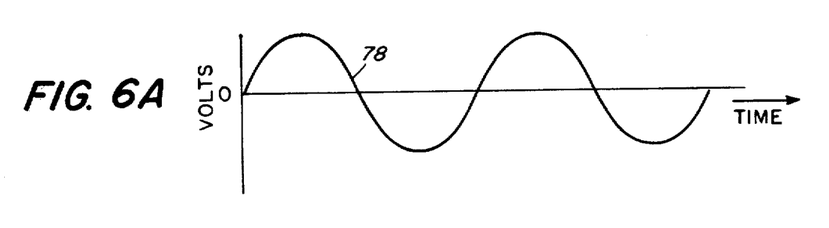
FIGS. 6A, 6B, 6C, 6D, 6E, 6F, 6G, 6H, 6I and 6J show signal curves developed at various points in the control circuit shown in FIG. 1 during focusing conditions.
Figure 6B:
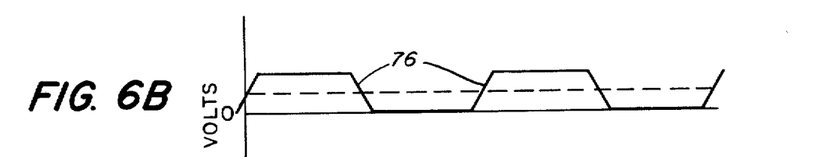

Consequently, as shown by a comparison of FIGS. 6A and 6B, the detector 56 produces pulsating electrical signals 76 which are in-phase with a sinusoidal signal 78 produced by the oscillatory drive means 24. As shown in FIG. 6E, due to the blocking action of capacitor 59, the circuit 60 receives only the alternating portion 80 of the output signal produced by detector 56. As a result, circuit 60 produces on output conductor 62 a steady-state positive signal 82, as shown in FIG. 6H, which activates servo motor drive means 66 to energize servo motor 40 and move target 36 away from lense 30.

When the selected surface 42 is disposed in the focal plane 34, the minimum size image spot 44 produced by beam 16 on surface 42, as shown in FIG. 3A, for example, does not move translationally with respect to axis 12. Consequently, approximately one-half of the light from image spot 44 on surface 42 passes the knife edge 54 and reaches the receptor surface 55 of detector 56 to produce, as shown in FIG. 6D, a constant value null signal 79, which does not pass through blocking capacitor 59. As a result, the phase sensitive detector circuit 60 receives the zero value voltage signal 84 shown in FIG. 6G and produces the zero value voltage signal 86 shown in FIG. 6J. Thus, the signal 86 on output conductor 62 de-activates the servo drive means 66 and de-energizes the servo motor 40. Accordingly, movement of the work table 38 and target 36 ceases when the selected surface 42 is disposed in the focal plane 34 of apparatus 10.

Figure 5:
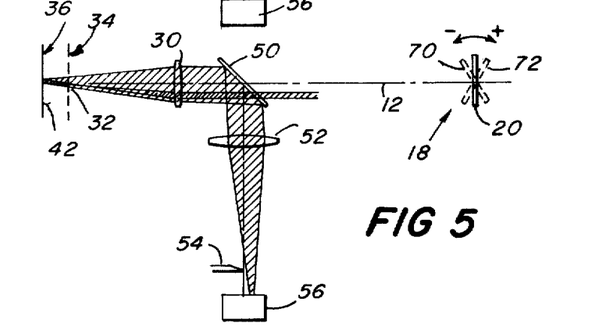
FIG. 5 is a schematic view of the image viewing means shown in FIG. 1 with the target surface beyond the focal plane.

As shown in FIG. 5, when the focal plane 34 is located between the lens 30 and the selected surface 42 of target 36, counterclockwise or negative rotation of plate 20 to a position, such as 70, for example, produces translational displacement of the resulting image spot on surface 42 in the positive direction with respect to axis 12. Conversely, clockwise rotation of plate 20 to a position, such as 72, for example, produces translational displacement of the resulting image spot on surface 42 in the negative direction with respect to axis 12. Thus, for the focusing conditions in FIG. 5, the displacements of the image spot produced on surface 42 are in the opposite direction from the corresponding displacements shown for the focusing conditions illustrated in FIG. 4. As a result, only light from the positive displacements of the image spots on surface 42 caused by negative rotational movements of the plate 20 reaches the receptor surface 55 of detector 56, when the surface 42 is disposed beyond the focal plane 34.

Figure 6C:
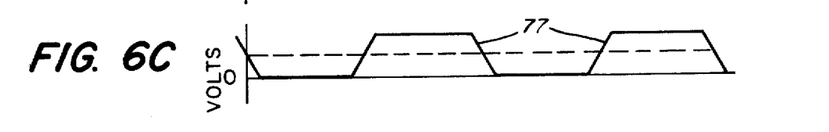
Figure 6D:
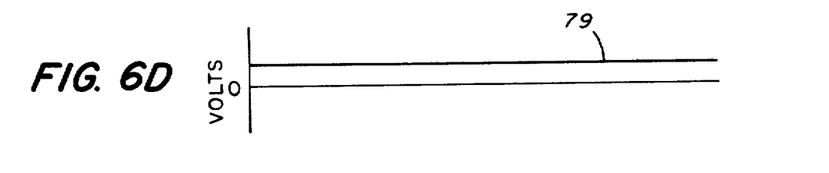
Figure 6E:
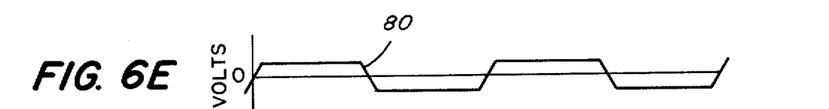
Figures 6F, 6G:
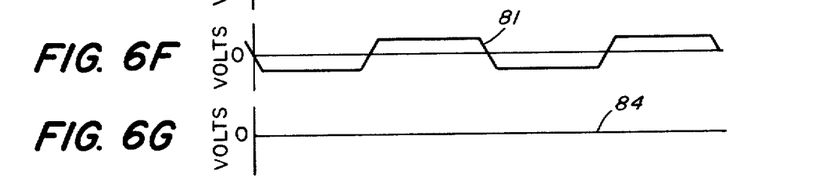
Figures 6H, 6I, 6J:
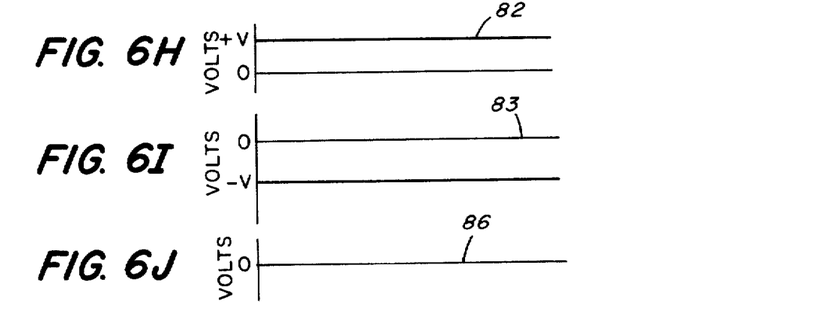

Accordingly, as shown by a comparison of FIGS. 6A and 6C, the detector 56 produces pulsating electrical signals 77 which are out-of-phase with the sinusoidal signal 78 received from oscillatory driver means 24. Due to the blocking action of capacitor 59, the phase sensitive detector circuit 60 receives, as shown in FIG. 6F, only the alternating signal portion 81 of the output signal from detector 56. Consequently, the circuit 60 applies to the output conductor 62 a steady-state negative output signal 83, as shown in FIG. 6I, which activates servo drive means 66 for energizing servo motor 40 and moving target 36 toward lens 30. When the selected surface 42 is disposed in the focal plane 34, the resulting minimum size image spot 44 produced on surface 42 remains stationary despite the oscillatory movement of beam 16 with respect to axis 12. As previously described, approximately one-half of the light from stationary image spot 44 passes knife edge 54 and reaches the receptor surface 55 of detector 56. As a result, the detector 56 produces, as shown in 6D the constant value null signal 79, which does not pass through capacitor 59. Consequently, circuit 60 receives, as shown in FIG. 6G, the zero value electrical signal 84, which causes circuit 60 to apply to output conductor 62 the zero value voltage signal 86 shown in FIG. 6J. Accordingly, the servo drive means 66 is de-activated by circuit 60 to de-energize motor 40 and cease further movement of target 36.

Referring again to FIG. 1, the system 10 may be embodied in a laser material removal system 90 including a laser 92, which comprises a higher power source of electromagnetic beam radiation than the helium-neon laser source 14. Laser 92 may be of the ruby rod type, for example, and is disposed for emitting a collimated beam 94 of electromagnetic energy having a substantially greater intensity than the intensity of beam 16. Consequently, the lower intensity beam 16 is more suitable for moving over the selected surface 42 of target 36 during focusing, but the higher intensity beam 94 is more suitable for removal of material by vaporization from a selected surface area when focusing is completed. Laser 92 is optically coupled to system 10 by suitable means, such as semi-transparent mirror 96, for example, which is aligned with the beam 94 and angularly disposed on the axis 12. Accordingly, the mirror 96 permits passage of the beam 16, and reflects the beam 92 to the objective lens 30. As a result, the lens 30 focuses both of the collimated beams, 16 and 92, respectively, onto the focal spot 32 in focal plane 34.

Electrically connected to conductor 62 may be a threshold detector device 98, such as a Schmitt Trigger, for example, which detects when the signal applied to conductor 62 falls to zero and applies an enabling electrical signal to its output conductor 97. As a result, a connected laser control means 99 is activated to operate a connected laser energizing source 100 which is coupled to laser 92. The source 100 may include a conventional power supply and Xenon flash pump lamp, for example, to activate the laser 92 and produce the beam 94. Thus, the higher intensity beam 94 is not focused on the selected surface 42 of target 36 until the selected surface is positioned in the focal plane 34.

Figure 7:
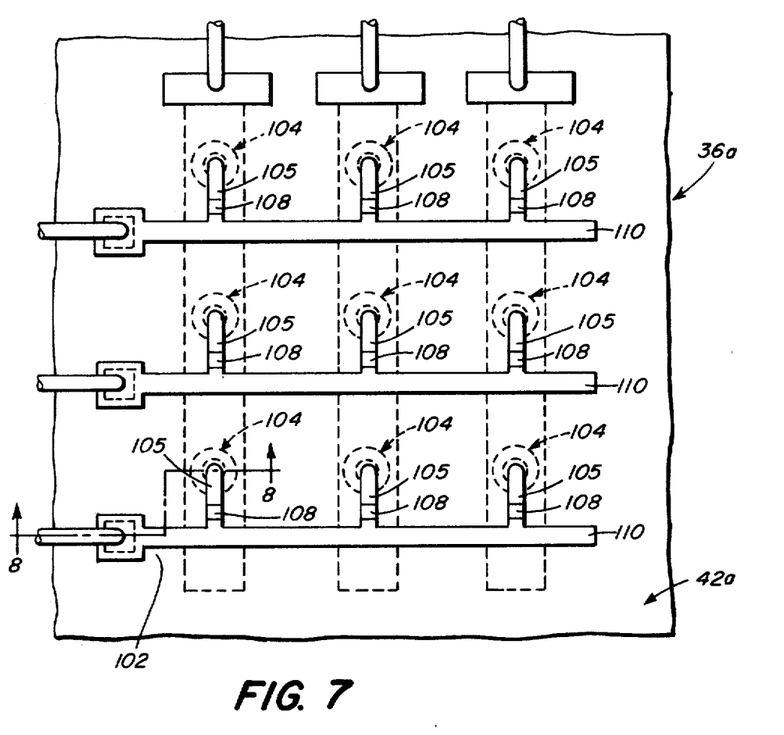
FIG. 7 is a fragmentary plan view of a typical workpiece for use with the apparatus shown in FIG. 1.
Figure 8:
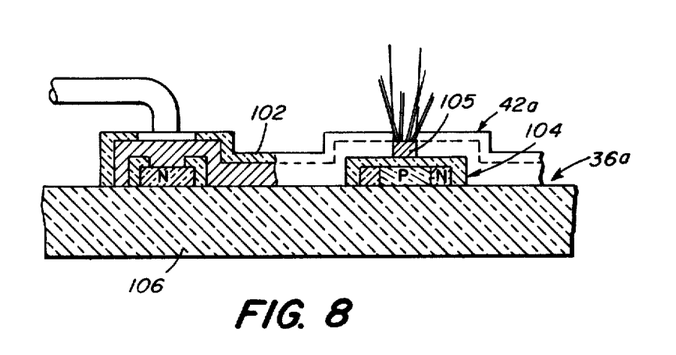
FIG. 8 is an enlarged fragmentary sectional view taken along the line 7—7 shown in FIG. 7 and looking in the direction of the arrows.

As shown in FIGS. 7 and 8, the target 36 may comprise a semiconductor memory device 36a, for example, having a selected surface 42a comprising a layer 102 of dielectric material. The layer 102 overlies a matrix-like array of semiconductor elements 104 supported on a dielectric substrate 106. Each of the elements 104 disposed in a row has a respective electrode conductor 105 extended through the layer 102 and connected through a respective fusible link 108 to a common conductive strip 110 of conductive metal plated on the upper surface 42a of layer 102.

As stated previously, the work table 38 may be computer controlled to move the semiconductor memory device 36a along X and Y coordinates in the focal plane 34. Consequently, any of the fusible links 108 on the selected surface 42a may be moved into the focal spot 32 of plane 34 where the high intensity beam 94 is focused. Thus, by energizing the laser 92 when selected fusible links 108 are positioned sequentially in the focal spot 32, the metallic material of the links 108 may be vaporized to open their electrical connections to the associated conductive strips 110. In this manner, the elements 104 may be selectively disconnected from the matrix-like array to produce a memory device 36a having a desired circuit configuration.

Accordingly, there has been disclosed herein apparatus including scanning means for determining the focal plane position of a beam focusing system and including automatic means for positioning a selected surface of a target in the focal plane. Thus, the apparatus of this invention may be used for obtaining maximum beam intensity and efficiency in the precision removal of material from selected surface areas of semiconductor devices, for example.

What is claimed is:

1. Automatic focusing apparatus comprising:
first means for producing a laterally translating beam of electromagnetic radiation and directing said beam successively along a plurality of paths intersecting at a focal spot in a focal plane; and
second means for detecting lateral translational movement of the directed beam in a transverse plane adjacent the focal plane and for determining the position of said transverse plane relative to said focal plane.

2. Automatic focusing apparatus comprising:
first means for laterally translating a beam of radiation with a periodic scanning motion having a predetermined frequency component and for directing said beam sequentially along a plurality of paths intersecting at a stationary focal spot in a focal plane; and
second means for detecting in a plane adjacent the focal plane periodic lateral translational motion of the directed beam having a frequency component substantially the same as said predetermined frequency component and for determining the phase relationship of said frequency components.

3. Automatic focusing apparatus comprising:
beam focusing means disposed for focusing a beam of electromagnetic radiation onto a focal spot in a focal plane;
beam translating means disposed for directing the beam along various paths of approach to the beam focusing means;
support means disposed for supporting a target in the path of the focused beam to produce an image of the beam on the target; and
automatic means disposed for evaluating the image with respect to the focal spot and accordingly producing relative movement between the target and the beam focusing means to position the target with respect to the focal plane.

4. Automatic focusing apparatus comprising:

beam translating means having an axis of symmetry and disposed for translating a beam of electromagnetic radiation laterally relative to the axis;

beam focusing means disposed for focusing the translated beam onto a focal spot in an axially spaced focal plane;

support means disposed for supporting a target in the path of the focused beam to produce thereon an image of the beam; and automatic means disposed for evaluating the image with respect to the focal spot and accordingly spacing the target relative to the beam focusing means to position the target in said focal plane.

5. Automatic focusing apparatus having an optical axis and comprising:

beam translating means movably disposed on said axis for laterally translating a beam of light relative to said axis;

beam focusing means disposed on said axis for focusing the translated beam onto a focal spot in a focal plane;

target means movably supported on said axis and having a surface disposed in the path of the focused beam for producing an image of the beam cross-section; and automatic means coupled to the target for evaluating said image and moving the target axially relative to the beam focusing means.

6. Automatic focusing apparatus as set forth in claim 5 wherein the beam translating means includes an optical element rotatably disposed about a line perpendicular to said axis.

7. Automatic focusing apparatus as set forth in claim 6 wherein the beam translating means includes drive means for rotating the element oscillatingly in a scanning manner.

8. Automatic focusing apparatus comprising:

source means disposed for directing a beam of electomagnetic radiation along a predetermined path;

beam scanning means disposed in said path for translating said beam laterally relative to said path;

beam focusing means disposed in said path for focusing the translated beam onto a focal spot in said path;

target means movably supported in said path and having a surface disposed adjacent said focal spot for producing an image of the beam; and automatic means coupled to the target means for evaluating said image with respect to the focal spot and accordingly spacing said surface of the target from the beam focusing means.

9. Automatic focusing apparatus as set forth in claim 8 wherein said source means includes laser means disposed for emitting a collimated beam of light.

10. Automatic focusing apparatus as set forth in claim 9 wherein said beam scanning means includes an optical plate rotatably disposed in said path.

11. Automatic focusing apparatus as set forth in claim 10 wherein said beam scanning means includes oscillatory drive means for rotating said plate oscillatingly in a symmetric manner with respect to said path.

12. Automatic focusing apparatus having an optical axis and comprising:

source means disposed for directing a beam of light along said axis;

beam translating means including an optical plate rotatably disposed on said axis for translating said beam laterally relative to said axis;

drive means connected to the optical plate for oscillatingly rotating said plate in a symmetrical manner with respect to said axis;

beam focusing means disposed on said axis for focusing the translated beam onto an axially spaced focal spot on said axis;

target means movably supported on said axis and having a surface disposed adjacent said focal spot for intercepting said beam and producing an image thereof;

automatic means coupled to the target and to the drive means for determining the location of said target surface relative to the focal spot and accordingly moving the target to position said surface thereof substantially at said focal spot.

13. Automatic focusing apparatus as set forth in claim 12 wherein the automatic means includes detector means optically coupled to said target surface for sensing lateral movement of said image relative to said axis and producing corresponding electrical signals.

14. Automatic focusing apparatus as set forth in claim 13 wherein the automatic means includes phase sensitive detector means connected to said detector means and to said drive means for comparing lateral movement of said image with rotary movement of said plate and determining the direction of movement required to position said target surface at said focal spot.

15. A material removal system comprising:

focus evaluating beam means disposed for emitting a first beam of electromagnetic radiation;

focusing means disposed in the path of the emitted first beam for focusing said first beam onto a focal spot in a spaced focal plane;

target means having a selected surface positioned in the path of the focused first beam for producing on said selected surface an incident cross-sectional image of the focused first beam;

automatic means coupled to said focus evaluating beam means, said focusing means, and said target means for automatically varying the path of said emitted first beam through the focusing means, evaluating the effect on said image, and accordingly adjusting the position of said selected surface relative to said focal plane; and material removal beam means coupled to said automatic means and said focusing means for receiving from the automatic means a signal indicative of said position adjustment of the selected surface being completed and in response thereto directing a second beam of electromagnetic energy through the focusing means and onto said selected surface of the target means.

16. A material removal system comprising:

a first source of electromagnetic energy disposed to direct a focus evaluating beam along an axis;

beam translating means disposed for translating said evaluating beam laterally with respect to said axis;

focusing means disposed for focusing the translated evaluating beam onto a focal spot in a spaced focal plane;

target means having a selected surface positioned in the path of the focused evaluating beam for producing on said selected surface an incident cross-sectional image of the focused evaluating beam;

automatic means coupled to said beam translating means and said target means for automatically directing said evaluating beam along varying paths through said focusing means, evaluating the effect on said image, and accordingly performing a position adjustment of said selected surface relative to said focal plane; and a second source of electromagnetic energy coupled to said automatic means and said focusing means for receiving a signal from said automatic means indicative of said position adjustment being completed and directing a material removal beam through said focusing means and onto said selected surface of the target means.

17. A material removal system comprising:

a first laser disposed to direct a first beam of light along an optical axis;

beam translating means disposed for oscillatingly translating said first beam laterally with respect to said optical axis in a scanning manner;

focusing means disposed for focusing the oscillatingly translatory first beam onto a focal spot in an axially spaced focal plane;

target means having a selected surface adjustably positioned in the path of the focused first beam for producing an incident cross-sectional image of said focused first beam;

automatic means coupled to said beam translating means, said focusing means, and said target means for automatically comparing any oscillating translatory movement of said image with oscillating translatory movement of said beam translating means to adjustably positioning said selected surface relative to the focal plane to obtain a substantially stationary image on said selected surface; and a second laser coupled to said automatic means and said focusing means for receiving from the automatic means a signal indicative of the substantially stationary image being on said selected surface and directing a second beam of light through said focusing means and onto said selected surface of the target means.

18. In combination:

beam focusing means disposed for directing a beam of electromagnetic radiation at a focal spot in a focal plane; and means responsive to a drive signal having a frequency component for periodically causing lateral translational movement of said beam over a surface of an object and including means for producing a periodic electrical signal having as a frequency component thereof the frequency component of the drive signal, the difference in phase between the frequency component of the drive signal and the frequency component of the electrical signal being related to the position of the object relative to the focal plane of the beam focusing means.

* * * * *